United States Patent Office 3,522,352
Patented July 28, 1970

3,522,352
METHOD OF INHIBITING FUNGAL GROWTH WITH LEAD MERCAPTIDES
Malcolm C. Henry, Harvard, Mass., and Adolf W. Krebs, Heidelberg, Germany, assignors, by direct and mesne assignments, to International Lead Zinc Research Organization, Inc., New York, N.Y., a non-profit corporation of New York
No Drawing. Original application Apr. 1, 1963, Ser. No. 269,771, now Patent No. 3,322,779, dated May 30, 1967. Divided and this application Apr. 27, 1967, Ser. No. 634,071
Int. Cl. A61l *13/00*; A01n *9/00*
U.S. Cl. 424—245                 5 Claims

ABSTRACT OF THE DISCLOSURE

Di- and triphenyllead mercaptides exhibiting marked antifungal activity, having the formula: $Ph_nPb(SR)_{4-n}$ wherein Ph is a phenyl group, R is an alkyl, aryl, aroyl, or acyl radical and $n$ is the integer 2 or 3.

---

This is a division of application Ser. No. 269,771, filed Apr. 1, 1963, now U.S. Pat. No. 3,322,779. This invention relates to a method for inhibiting the growth of fungi, and more particularly to phenyl substituted tetra-valent lead mercaptides exhibiting marked antifungal activity.

It is an object of the invention to provide a method for inhibiting the growth of fungi. Compositions found to exhibit unexpected antifungal activity and di- and triphenyllead mercaptides represented by the formula:

$$Ph_nPb(SR)_{4-n}$$

wherein Ph is a phenyl group, R is a radical selected from the group of alkyl, aryl, aroyl and acyl radicals, and $n$ is the integer 2 or 4.

The reaction for producing these compounds may be represented as follows:

$$(n-1)Ph_nPbCl_{4-n} + Pb(SR)_2 \rightarrow$$
$$(n-1)Ph_nPb(SR)_{4-n} + PbCl_2$$

The compounds $Pb(SR)_2$ may first be formed by the known reaction $$2RSH + Pb(OAc)_2 \rightarrow Pb(SR)_2 + 2HOAc$$

Thus two molar equivalents of the respective mercaptan or thioacid dissolved in alcohol were dropped slowly into refluxing 50% alcoholic solution containing one molar equivalent of lead (II) acetate. An almost immediate precipitation of the yellow lead (II) mercaptide or lead (II) salt of the thioacid takes place.

The following table is a tabulation of organolead compounds prepared according to the present invention, and is illustrative of the scope of the antifungal compounds.

TABLE I

| | Formula | Compound | Melting point, ° C. |
|---|---|---|---|
| 1. | $(C_6H_5)_3PbSCH_3$ | Thiomethyl triphenyllead | 108–109 |
| 2. | $(C_6H_5)_3PbSC_2H_5$ | Thioethyl triphenyllead | 67–68 |
| 3. | $(C_6H_5)_3PbSC_3H_7$ | Thiopropyl triphenyllead | 57–58 |
| 4. | $(C_6H_5)_3PbSC_4H_9$ | Thiobutyl triphenyllead | (¹) |
| 5. | $(C_6H_5)_3PbSCH_2C_6H_5$ | Thiobenzyl triphenyllead | 82–83 |
| 6. | $(C_6H_5)_3PbSC_6H_5$ | Thiophenyl triphenyllead | 106–107 |
| 7. | $(C_6H_5)_3PbS\overset{O}{\underset{\parallel}{C}}CH_3$ | Thioacetyl triphenyllead | 92–93 |
| 8. | $(C_6H_5)_3PbS\overset{O}{\underset{\parallel}{C}}C_6H_5$ | Thiobenozyl triphenyllead | 93–94 |
| 9. | 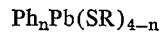 | Thionaphthyl triphenyllead | 73–75 |
| 10. | $(C_6H_5)_3PbSCH_2\overset{O}{\underset{\parallel}{C}}OCH_3$ | Thiomethylcarbomethoxy triphenyllead | 85 |
| 11. | 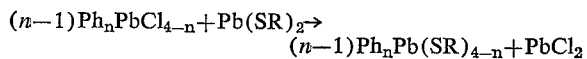 | Thiobenzthiazolyl triphenyllead | 58 |
| 12. | 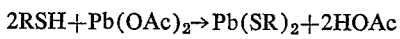 | Dithiobenzthiazolyl diphenyllead | 152–153 |
| 13. | (C₆H₅)₃PbSC (benzoxazole ring) | Thiobenzoxazoyl triphenyllead | 65 |
| 14. | $(C_6H_5)_3PbS(CH_2)_9CH_3$ | Thiodecyl triphenyllead | (¹) |
| 15. | $(C_6H_5)_2Pb(SCOCH_3)_2$ | Bisthioacetyl diphenyllead | 94–95 |

¹ Decomposed at B.P.

The di- and triphenyllead mercaptides were found to inhibit the growth of fungi. A series of antifungal tests was carried out on various of our novel organolead-sulfur compounds.

The tests were of the roll culture type, where a certain amount of a concentrated acetonic solution of the compound and a drop of a dense conidial suspension of the mould were added to the warm agar in small bottles. After mixing the agar was solidified by cooling. The bottles were incubated at 24° C. for 3 days. Control growth was abundant on the medium applied. Suppression of growth by the compounds studied increased as a rule slowly with increasing concentration, growth still being suboptimal in concentrations far below the concentration of complete inhibition. Those concentrations which after 3 days allowed no more than barely visible growth were read as "completely inhibitory."

In Table II, the activity of the compound is that represented by the minimal concentration in parts per million causing complete inhibition of visible growth. Known compounds 5 to 8 are given for the sake of comparison. The test organisms were:
*Botrytis allii*=B; *Penicillium italicum*=P; *Aspergillus niger*=A; and *Rhizopus nigricans*=R.

dark brown material. All are readily soluble in benzene, n-hexane, alcohol, chloroform, and most of the other common organic solvents. The infrared absorption spectra of all compounds show, besides the usual absorptions associated with aromatic compounds and the respective group attached to the sulfur, the band at 1052 cm.$^{-1}$, typical for oganolead compounds.

Methyl iodide reacted quantitatively at room temperature with thiomethyl triphenyllead to yield triphenyllead to yield triphenyllead iodide and dimethyl sulfide, probably through an unstable sulfonium salt intermediate:

$(C_6H_5)_3PbSCH_3 + CH_3I \longrightarrow$

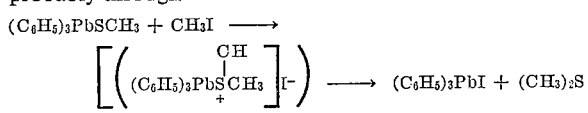

$\longrightarrow (C_6H_5)_3PbI + (CH_3)_2S$

This reaction did not take place with triphenyllead thioacetate; apparently the acetyl group decreases the electron density at the sulfur atom so that formation of a sulfonium intermediate becomes impossible.

Mineral acids cleaved the lead-sulfur bond preferentially; however, cleavage of lead-phenyl bonds was always detected. For example, mixtures of triphenyllead chloride, diphenyllead dichloride and lead chloride were

TABLE II.—ANTIFUNGAL ACTIVITY OF ORGANOLEAD COMPOUNDS

| Formula | | B | P | A | R |
|---|---|---|---|---|---|
| 1. $Ph_3PbSMe$ | Thiomethyl triphenyllead | 2 | 2 | 2 | 5 |
| 2. $Ph_3PbSC_3H_7$ | Thiopropyl triphenyllead | 1 | 2 | 2 | 2 |
| 3. $Ph_3PbSCH_2Ph$ | Thiobenzyl triphenyllead | 1 | 5 | 2 | 2 |
| 4. $Ph_3PbSCOPh$ | Thiobenzoyl triphenyllead | 2 | 5 | 2 | 5 |
| 5. $Ph_3PbPbPh_3$ | Hexaphenyldilead | 500 | 500 | 500 | 500 |
| 6. $Ph_4Pb$ | Tetraphenyllead | 100 | 100 | 100 | 100 |
| 7. $Ph_3PbMe$ | Triphenylmethyllead | 200 | 500 | 500 | 500 |
| 8. $(Ph_3Pb)_2S$ | Triphenyllead disulfide | 100 | 100 | 50 | 100 |

The following are examples of the preparation of the di- and triphenyllead mercaptides. They are not intended to limit in any way the scope of the invention.

EXAMPLE I (a) The preparation of thiomethyl triphenyllead

Stoichiometric amounts of triphenyllead chloride and lead (II) methyl mercaptide were refluxed in benzene for three hours. During this time the lead (II) methyl mercaptide was converted into white lead (II) chloride.

$2(C_6H_5)_3PbCl + Pb(SCH_3)_2 \rightarrow 2(C_6H_5)_3PbSCH_3 + PbCl_2$

The lead chloride was filtered off, the benzene evaporated, and the remaining residue of $(C_6H_5)_3PbSCH_3$, melting point 106–108° (yield: quantitative) recrystallized from hexane; M.P. of pure compound 108–109°. Mixed melting points with admixture of a known sample gave no depression.

By starting with the corresponding lead (II) ethyl mercaptide, the compound thioethyl triphenyllead may be prepared following the procedure of Example 1(a).

(b) The preparation of thio n-propyl triphenyllead.

N-propyl lead (II) mercaptide was first prepared as given above i.e., from stoichiometric amounts of the corresponding thiol and lead acetate in 50% aqueous alcohol, and after washing the so-formed salt with water, it was dried in a vacuum desiccator.

Triphenyllead chloride, 4.86 g. (10 mmoles), and lead (II) n-propyl mercaptide, 1.79 g. (5 mmoles), in 100 ml. benzene were refluxed with stirring for three hours. During this time the yellow mercaptide was converted into white insoluble lead chloride which was filtered off at the end of the reaction period. The filtrate was evaporated and the residue recrystallized from ethanol, yield 4.84 g. (95%), M.P. 57–58°.

The compounds described above are white, or slightly colored crystalline compounds, with the exception of the liquid butyl and decyl compounds. The former, the solids compounds, decompose above the melting point to a obtained from the reaction of thioalkyl triphenyllead compounds and hydrochloric acid.

EXAMPLE 2

(a) The preparation of bis-thioacetyl diphenyllead

Stoichiometric quantities of diphenyllead dichloride and lead (II) thioacetate were suspended in toluene, and the mixture refluxed for four hours. The reaction follows that above given, viz:

$(C_6H_5)_2PbCl_2 + Pb(SCOCH_3)_2 \rightarrow (C_6H_5)_2Pb(SCOCH_3)_2 + PbCl_2$

The compound obtained, bis-thioacetyl diphenyllead having a cream color, was in 81% yield.

Other diphenyl, di-substituted lead mercaptides were produced in a similar manner.

(b) Preparation of thioacetyl triphenyllead

This compound was prepared in exactly the same manner as set forth in Example 2(a) above, using triphenyllead chloride instead of the diphenyl compound.

We claim:
1. A method of inhibiting the growth of fungi, comprising treating said fungi with a composition containngi a fungicidially effective amount of a compound selected from the group consisting of di- and triphenyllead mercaptides of the following formula:

$$Ph_nPb(SR)_{4-n}$$

wherein Ph represents the phenyl radical, R is a radical selected from the group consisting of lower alkyl, phenyl, naphthyl, benzthiazolyl, benzoxazoyl, and benzyl, and n is an integer from 2 to 3.

2. A method of inhibiting the growth of fungi comprising treating said fungi with a composition containing a fungicidal amount of a compound selected from the group consisting of thiomethyl triphenyllead, thiopropyl triphenyllead, thiobenzyl triphenyllead, and thiobenzoyl triphenyllead.

3. A method as set forth in claim 1, wherein said R of said mercaptides is a saturated alkyl group of from one to ten carbon atoms containing from one to ten carbon atoms.

4. A method as set forth in claim 1, wherein said R of said mercaptides is selected from the group consisting of phenyl, naphthyl and benzyl radicals.

5. A method as set forth in claim 1, wherein said R of said mercaptides is selected from the group consisting of benzthiazolyl and benzoxazoyl radicals.

References Cited

UNITED STATES PATENTS

| | | | |
|---|---|---|---|
| 2,044,934 | 6/1936 | Calcott | 167—30 XR |
| 3,073,854 | 1/1963 | Ballinger | 260—437 |
| 3,142,614 | 7/1964 | Ligett. | |
| 2,789,104 | 4/1957 | Ramsden et al. | 260—45.75 |

OTHER REFERENCES

Leeper et al.: Chemical Reviews, 1954, vol. 54, pp. 136–152.

ALBERT T. MEYERS, Primary Examiner

D. R. ORE, Assistant Examiner

U.S. Cl. X.R.

424—293

PO-1050
(5/69)

UNITED STATES PATENT OFFICE
CERTIFICATE OF CORRECTION

Patent No. 3,522,352      Dated July 28, 1970

Inventor(s) Malcolm C. Henry and Adolf W. Krebs

It is certified that error appears in the above-identified patent and that said Letters Patent are hereby corrected as shown below:

Col. 2, line 1, "the" should be --this--; Table I, compound of Formula 8, "Thiobenozyl" should be --Thiobenzoyl--. Col. 3, Table II, Formula 3, "Ph$_3$PbSCH$_3$Ph" should be --Ph$_3$PbSCH$_2$Ph--; Table II, Formula 8, "(Ph$_3$Pb)$_3$S" should be --(Ph$_3$Pb)$_2$S--. Col. 4, line 9, cancel "to yield triphenyllead"; lines 58-59, "containngi" should be --containing--; line 59, "fungicidially" should be --fungicidally--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents